(12) United States Patent
Browne et al.

(10) Patent No.: US 7,548,010 B2
(45) Date of Patent: Jun. 16, 2009

(54) ACTIVE MATERIAL BASED ACTUATORS FOR LARGE DISPLACEMENTS AND ROTATIONS

(75) Inventors: Alan L. Browne, Grosse Pointe, MI (US); Gary L. Jones, Farmington Hills, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 476 days.

(21) Appl. No.: 11/231,332

(22) Filed: Sep. 20, 2005

(65) Prior Publication Data

US 2006/0145544 A1 Jul. 6, 2006

Related U.S. Application Data

(60) Provisional application No. 60/611,726, filed on Sep. 21, 2004.

(51) Int. Cl.
*H02N 2/00* (2006.01)
(52) U.S. Cl. ............... 310/307; 310/323.17; 310/26; 310/12
(58) Field of Classification Search ............ 310/12, 310/26, 300, 307, 323.17, 328
See application file for complete search history.

(56) References Cited

U.S. PATENT DOCUMENTS

| | | | |
|---|---|---|---|
| 3,292,019 A * | 12/1966 | Hsu et al. ............ 310/328 |
| 5,389,845 A * | 2/1995 | Brimhall ............ 310/26 |
| 6,762,515 B2 | 7/2004 | Gummin et al. ............ 310/12 |
| 7,309,943 B2 * | 12/2007 | Henderson et al. ..... 310/323.02 |
| 7,309,946 B2 * | 12/2007 | Hwang et al. ............ 310/332 |
| 2002/0143344 A1* | 10/2002 | Taylor ............ 606/105 |
| 2004/0112049 A1 | 6/2004 | Behrens et al. ............ 60/257 |
| 2005/0035687 A1* | 2/2005 | Xu et al. ............ 310/328 |
| 2005/0127786 A1* | 6/2005 | Hendriks et al. ............ 310/328 |
| 2006/0055285 A1* | 3/2006 | DeVries et al. ............ 310/328 |
| 2006/0158228 A1* | 7/2006 | Hwang et al. ............ 327/1 |
| 2006/0197167 A1* | 9/2006 | Dooley ............ 257/421 |
| 2007/0236314 A1* | 10/2007 | Taya et al. ............ 335/220 |

\* cited by examiner

*Primary Examiner*—Thomas M Dougherty

(57) ABSTRACT

An actuator adapted to incrementally translate and/or rotate an object, the actuator comprising a body comprising a first portion, a second portion, and an opening coaxially extending from the first portion and the second portion, wherein the opening is dimensioned to accommodate a diameter or cross section of an object; a first element disposed in the first portion, and a second element disposed in the second portion, wherein the first and second elements are adapted to selectively clamp the object; a spring in operative communication with the first and second portions; and a third element fixedly attached to the first and second portions, wherein at least one of the first, second, or third elements or spring is formed of an active material.

7 Claims, 4 Drawing Sheets

ACTIVE MATERIAL BASED ACTUATORS FOR LARGE DISPLACEMENTS AND ROTATIONS

CROSS REFERENCE TO RELATED APPLICATIONS

This application relates to and claims priority to U.S. Provisional Patent Application No. 60/611,726 filed on Sep. 21, 2004, incorporated herein by reference in its entirety.

BACKGROUND

The present disclosure generally relates to actuators that incrementally provide large displacements and/or rotations to an object, and more particularly, to actuators comprising active materials that incrementally provide large displacements and/or rotations to an object.

Active materials such as shape memory alloys, piezoelectrics, magnetorheological polymers, electroactive polymers, and the like are used as limited displacement type actuators. The use of active material actuators in place of mechanical actuators such as solenoids, servo-motors, and the like, minimizes the complexity associated with these types of actuators. Moreover, these materials generally provide a lightweight alternative, minimize packaging space, and provide lower acoustic outputs during operation. However, because these materials provide limited displacement, they have not found utility in actuators that provide large displacements and/or rotations to an object.

In general, actuation distance of active material based actuators is quite limited, being approximately 0.1% of actuator length with piezoelectric materials, 4% with shape memory alloys and magnetic shape memory alloys, and a few % with magnetorheological polymers. Electroactive polymers offer the potential for large displacements (with some in excess of 100%) but at dramatically lower force levels than piezoelectric materials, SMA's, MSMA's, or other form of magnetostrictive or electrostrictive material. Single actuation cycles produced by the field-induced strain of active materials are thus, except for the case of low actuation forces, themselves quite small. Most approaches for achieving large displacements through field activation of active materials have focused on innovative approaches to packaging long lengths of active materials within small volumes.

Accordingly, it would be desirable to utilize the attendant advantages of active materials in actuators and provide large displacements or rotations to an object.

BRIEF SUMMARY

Disclosed herein is an actuator adapted to incrementally translate and/or rotate an object, the actuator comprising body comprising a first portion, a second portion, and an opening coaxially extending from the first portion and the second portion, wherein the opening is dimensioned to accommodate a diameter or cross section of an object; a first element disposed in the first portion, and a second element disposed in the second portion, wherein the first and second elements are adapted to selectively clamp the object; a spring in operative communication with the first and second portions; and a third element fixedly attached to the first and second portions, wherein at least one of the first, second, and third elements is formed of an active material.

A process for translating an object comprises inserting an object into a body of an actuator, wherein the body comprises a first portion, a second portion, and an opening coaxially extending from the first portion and the second portion, wherein the opening is dimensioned to accommodate a cross section of the object; clamping the object at the first portion; compressing a spring in operative communication with the first portion and the second portion; clamping the object at the second portion; and simultaneously unclamping the object at the first portion and decompressing the spring to incrementally translate the object through the body, wherein the clamping and/or the compressing comprises activating an active material.

A process for rotating an object comprises inserting an object into a body of an actuator, wherein the body comprises a first portion, a second portion, and an opening coaxially extending from the first portion and the second portion, wherein the opening is dimensioned to accommodate a diameter or cross section of the object; clamping the object at the first portion; compressing a torsional spring in operative communication with the first portion and the second portion; clamping the object at the second portion; and simultaneously unclamping the object at the first portion and decompressing the torsional spring to incrementally rotate the object, wherein the clamping and/or the compressing comprises activating an active material.

The above described and other features are exemplified by the following figures and detailed description.

BRIEF DESCRIPTION OF THE DRAWINGS

Referring now to the figures, which are exemplary embodiments and wherein like elements are numbered alike.

DETAILED DESCRIPTION

Figure 1:
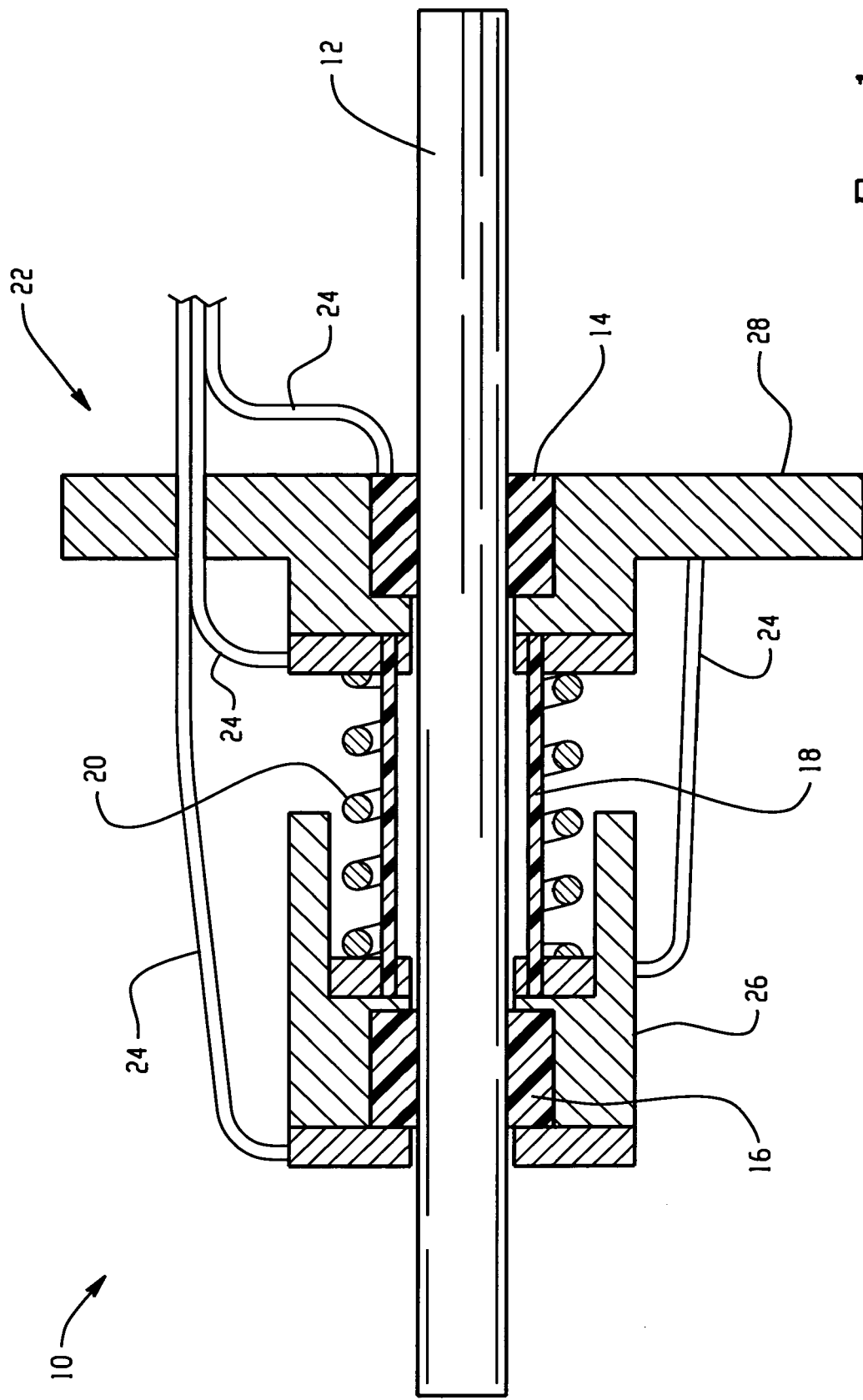
FIG. 1 illustrates a plan view of an active material based actuator.

Disclosed herein are active material based actuators that are adapted to incrementally provide large displacements or rotations to an object. The active material is one which the shape and/or modulus properties (such as flexural properties, shear strength, or the like, where applicable) can be selectively varied by means of an activation signal. Suitable active materials include, but are not intended to be limited to, shape memory alloys (SMA), ferromagnetic SMAs (MSMA), electroactive polymers (EAP), magnetorheological fluids and/or polymers (MR), piezoelectric polymers, piezoelectric ceramics, electrostrictive, magnetostrictives, electrorheological fluids, various combinations of the foregoing materials, and the like. Suitable activation signals for reversibly changing the shape and modulus properties will depend on the type of material utilized and may comprise a heat signal, an electrical signal, a magnetic signal, and combinations comprising at least one of the foregoing signals, and the like.

Generally, the active material based actuators comprise physically linking the actuator with the object that is to be translated and/or rotated. Displacement and/or rotation is then produced or assisted through repetitive changes in shape (e.g., dimension) and/or modulus and /or shear strength properties of the active material. That is, the active material is activated by means of an applied activation signal resulting in a change in its modulus or shape properties.

By way of example, the object to be translated and/or rotated is first clamped in the position at one end of the actuator, which may be a conventional clamp mechanism or may be an active material based element that functions to clamp the object upon activation as will be described in greater detail below. A second active element then functions to provide translation and/or rotation of the other end of the actuator with respect to the object upon receipt of an activation signal. The other end of the actuator is then clamped, which may be a conventional clamp mechanism or may be an additional active material based element that functions in this capacity. The first clamp is released and the second active element that provided translation and/or rotation is deactivated to restore its original setting resulting in incremental displacement of the first clamp with respect to the object. The original setting can be restored by selecting an active material that exhibits a two way effect as will be described in greater detail below or alternatively, through the use of a biasing return force, e.g., a spring, for those active materials that exhibit a one way effect. The process is then repeated by reclamping the first (one) end of the actuator, and releasing releasing the clamp at the other end, e.g., deactivating the second active material based actuator or releasing the clamp. A second activation signal is then applied to the active material based element that functions to provide the incremental translation and/or rotation of the clamps with respect to the object. The process may be repeated any number of desired times to effect the desired amount of translation and/or rotation.

As will be apparent to those skilled in the art, suitable smart materials for providing clamping, when desired, include SMAs, MSMAs, EAPs, MRs, piezoelectric polymers, piezoelectric ceramics, electrostrictive, magnetostrictives, electrorheological fluids, various combinations of the foregoing materials, and the like. For translation and/or rotation of the object, suitable smart materials include SMAs, MSMAs, EAPs, piezoelectric polymers, piezoelectric ceramics, electrostrictive, magnetostrictives, various combinations of the foregoing materials, and the like.

Turning now to FIGS. 1-4, an exemplary active material based actuator, generally designated 10, is illustrated. The actuator is not intended to be limited to this particular embodiment nor is it intended to be limited to any specific active material therein. The illustrated actuator is adapted to incrementally provide large displacements (translation) to an object. Although the actuator is described with reference to incremental translation, one of ordinary skill in the art will appreciate that the actuator can be adapted to provide incremental rotation with minimal modification. Suitable objects for which the actuator is applicable are virtually limitless and include, for example, cables, rods, bars, shafts, and the like. In most cases, as will be obvious to those skilled in the art, the actuators can be used with little to no modification for achieving large displacements and rotations of objects having quite a broad range of shapes and sizes. For objects to be rotated, a relatively regular cross section along the length of object is desired. Likewise, the actuators can be used for a variety of applications where large displacements and/or large rotations may be desired. For example, in automotive applications, the actuator can be used in tailgate and lift gate designs, snug down mechanisms, louver movement, and the like.

Figure 2:
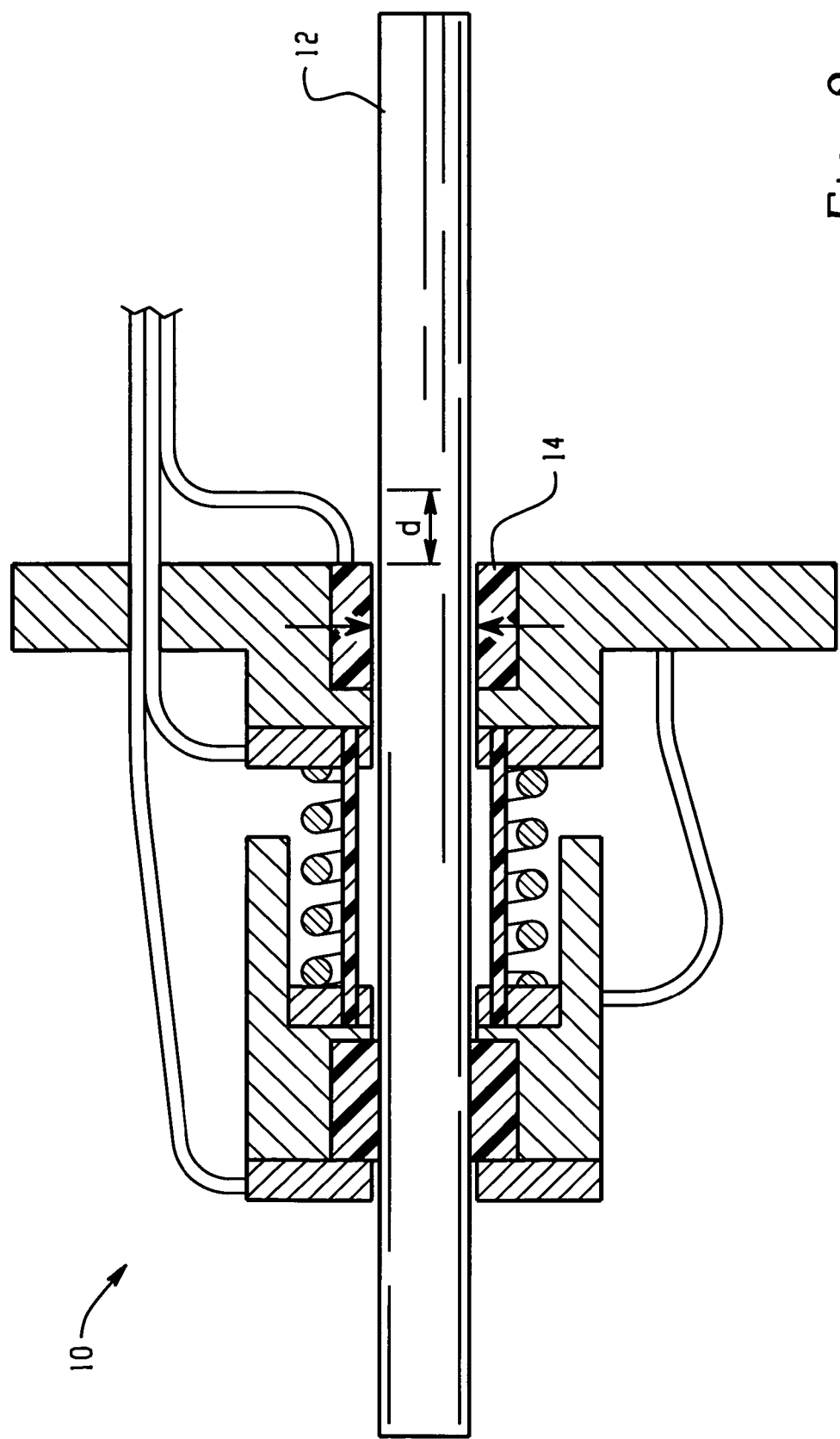
FIGS. 2-4 illustrate plan views of the active material based actuator of FIG. 1 at various stages of operation in accordance with one embodiment.
Figure 3:
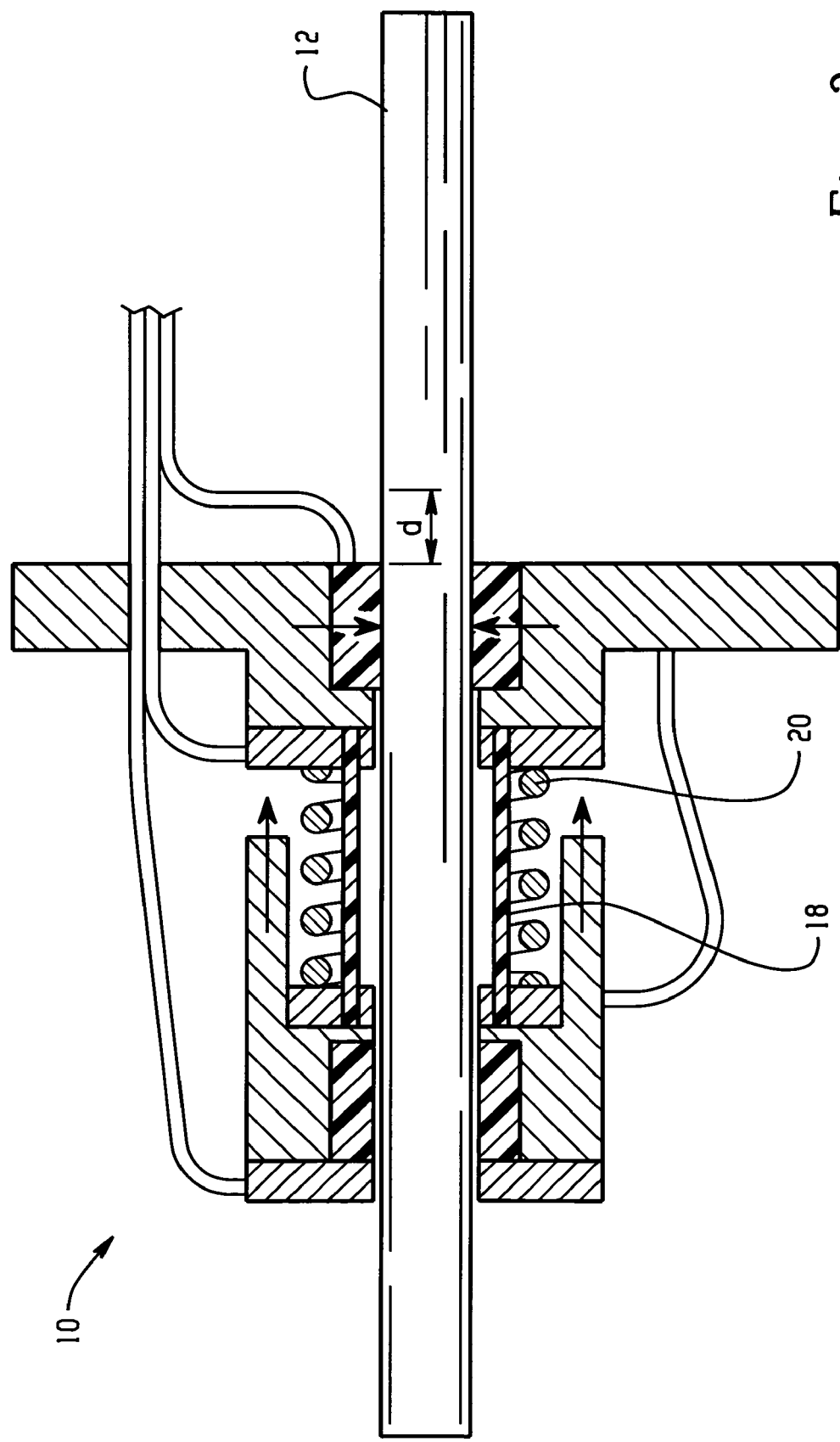
Figure 4:
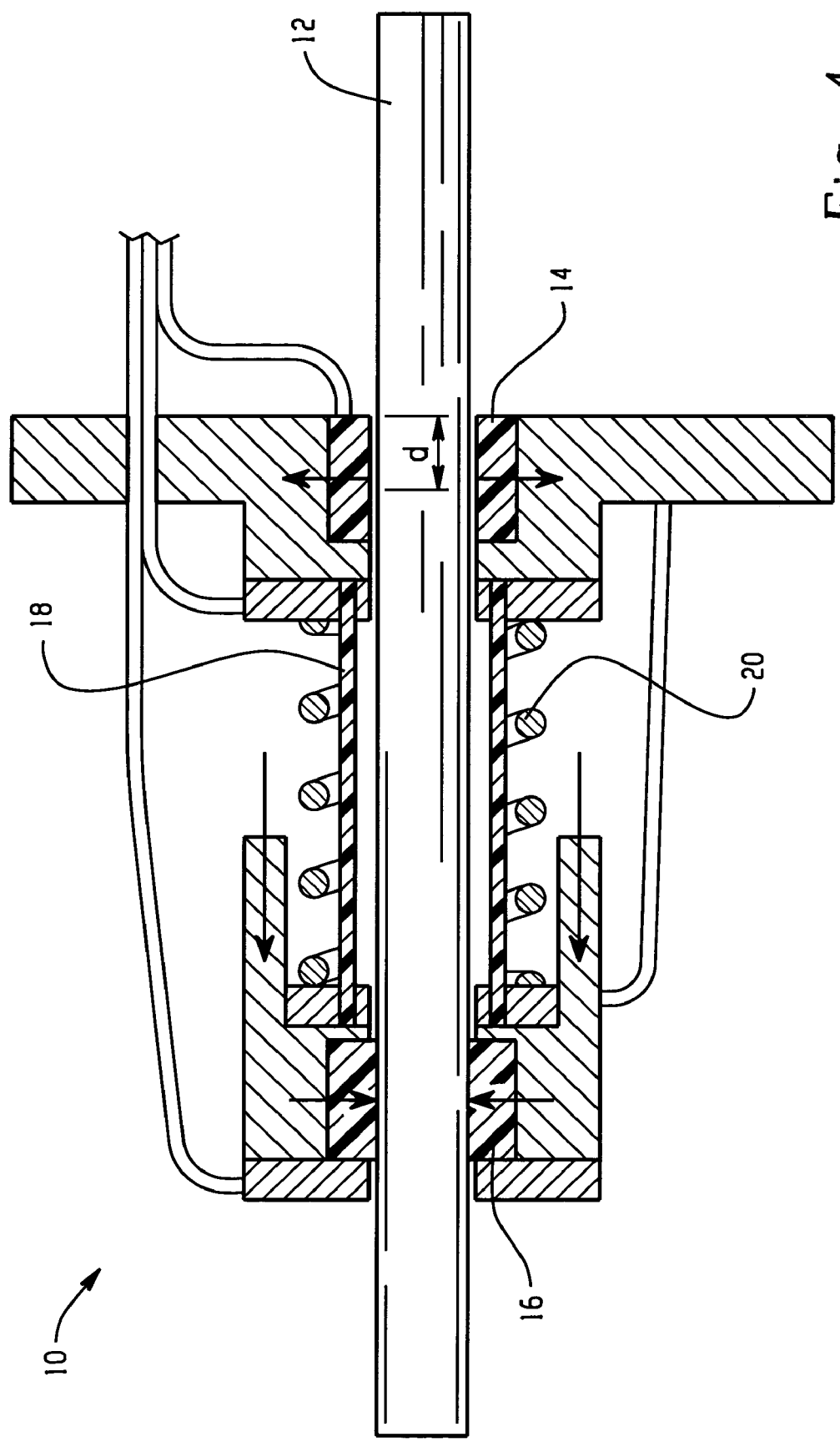

FIG. 1 illustrates the active material based actuator 10 in a neutral position physically linked to an object 12. As shown, there are four elements 14, 16, 18, 20, within a body 22 that cooperatively provide incremental translation to the object 12; wherein each increment is represented by distance d (as shown in FIGS. 2-4). The body 22 includes a first portion 26 and a second portion 28. At least one, or more, or all of the four elements comprise the active material. The remaining elements if it does not comprise active material may comprise electromechanical, hydraulic, pneumatic, and/or mechanical means for assisting in the incremental translation and/or rotation of the object. Advantageously, the use of at least one, or more, or all of active material elements provides a robust, compact, lightweight, and less complex actuator. Moreover, the use of active materials lowers the acoustical noise associated with the actuator.

In the exemplary active material based actuator 10, elements 14 and 16 are configured to provide clamping action upon actuation, wherein element 14 is disposed in body portion 28 and element 16 is disposed in body portion 26. Element 20 is a spring in operative communication with body portions 26, 28. The spring 20 cooperatively operates with element 18 to provide translation to the object 12, wherein element 18 is illustrated as wires (two of which are shown) parallel to the object. The actuator 10 may further comprise conduits 24 for providing actuation to the various elements. For example, if element 14 is a pneumatic clamp, conduit 24 can provide pressurized gas to provide selective clamping action of element 14 on object 12; if element 14 is a hydraulic clamp, conduit can provide pressurized liquid to provide selective clamping; if element 14 is an electromechanical clamp, the conduit can provide an effective amount of current to the clamp to effect clamping action; and so forth. In the case of active materials, the conduit 24 can provide a suitable activation signal. The conduits 24 are preferably in operative communication with a controller for selectively providing the activation signals suitable for activating the specific element. As previously described, the activation signal will vary based on the type of active material as well as the type of "non-active" mechanism employed, e.g., pneumatic clamp.

As generally shown by the arrows in FIGS. 2-4, during operation of the actuator 10, element 14 is first activated so that the object is clamped in place within the actuator body 22 (FIG. 2). For example, if element 14 is pneumatic clamp, the element is pressurized to provide clamping force to the object. If element 14 comprises an active material, the active material is activated. For example, if the active material is a magnetorheological fluid, a magnetic signal is applied to increase the shear strength of the fluid such that the object is clamped in place.

As previously stated, at least one, or more, or all of the elements 14, 16, 18, and 20 comprise an active material. As such, the elements may be activated by any of the mechanical means previously discussed or by an activation signal specific to the active material to effect a shape and/or modulus change. While the object is clamped in place, element 18 can be activated in so doing shortening it (for example by 4% in the case of shape memory alloys) such that the spring 20 is compressed (as shown in FIG. 3).

As shown in FIG. 4, element 16 is then activated followed by deactivation of elements 14 and 18. As a result, the object 12 is clamped in place at element 16 allowing translation of the object 12 (to the left in FIG. 4) in the direction of element 14 to occur (FIG. 4). Optionally, if spring 20 is an extension spring formed of an active material, the spring 20 may be compressed by applying an activation signal to element 18. In this case, deactivation of clamp 14 followed by activation (expansion) of spring 20 would translate object 12 to the left. The translated distance is represented by "d". For example, if element 18 is formed of a shape memory alloy, the object would translate about 4% the length of the deactivated wire. Of course, depending on the desired direction of translation, activation and deactivation of the various elements can be reversed or changed.

Note that if the clamps 14 and 16 are comprised of SMA's and MSMA's, the clamps would preferably include a return "spring" mechanism to release the object upon discontinuation of the activation signal. It is noted that incremental translation and/or rotation generally uses relatively large cycle times, which may limit the applicability to applications in which relatively fast actuation is not required. However, by using the above noted mechanisms to incrementally compress (or extend/stretch) and thus store energy (and thereby actuation displacements) in mechanical or pneumatic "springs", rapid large distance actuations can be achieved through on-demand release of the spring. To use such mechanisms in this manner in the majority of embodiments would involve the inclusion of additional clamping/locking sub-mechanisms such as a ratchet in a manner obvious to those skilled in the art.

Various active materials are suitable for use in the actuator. For example, piezoelectric materials can be employed and adapted to provide clamping action. The active material may also comprise a piezoelectric material. Also, in certain embodiments, the piezoelectric material may be configured as an actuator for providing rapid deployment, if desired. As used herein, the term "piezoelectric" is used to describe a material that mechanically deforms (changes shape) when a voltage potential is applied, or conversely, generates an electrical charge when mechanically deformed. Preferably, a piezoelectric material is disposed on strips of a flexible metal or ceramic sheet. The strips can be unimorph or bimorph. Preferably, the strips are bimorph, because bimorphs generally exhibit more displacement than unimorphs.

One type of unimorph is a structure composed of a single piezoelectric element externally bonded to a flexible metal foil or strip, which is stimulated by the piezoelectric element when activated with a changing voltage and results in an axial buckling or deflection as it opposes the movement of the piezoelectric element. The actuator movement for a unimorph can be by contraction or expansion. Unimorphs can exhibit a strain of as high as about 10%, but generally can only sustain low loads relative to the overall dimensions of the unimorph structure. A commercial example of a pre-stressed unimorph is referred to as "THUNDER", which is an acronym for THin layer composite UNimorph ferroelectric Driver and sEnsoR. THUNDER is a composite structure constructed with a piezoelectric ceramic layer (for example, lead zirconate titanate), which is electroplated on its two major faces. A metal pre-stress layer is adhered to the electroplated surface on at least one side of the ceramic layer by an adhesive layer (for example, "LaRC-SI®" developed by the National Aeronautics and Space Administration (NASA)). During manufacture of a THUNDER actuator, the ceramic layer, the adhesive layer, and the first pre-stress layer are simultaneously heated to a temperature above the melting point of the adhesive, and then subsequently allowed to cool, thereby re-solidifying and setting the adhesive layer. During the cooling process the ceramic layer becomes strained, due to the higher coefficients of thermal contraction of the metal pre-stress layer and the adhesive layer than of the ceramic layer. Also, due to the greater thermal contraction of the laminate materials than the ceramic layer, the ceramic layer deforms into an arcuate shape having a generally concave face.

In contrast to the unimorph piezoelectric device, a bimorph device includes an intermediate flexible metal foil sandwiched between two piezoelectric elements. Bimorphs exhibit more displacement than unimorphs because under the applied voltage one ceramic element will contract while the other expands. Bimorphs can exhibit strains up to about 20%, but similar to unimorphs, generally cannot sustain high loads relative to the overall dimensions of the unimorph structure.

Suitable piezoelectric materials include, but are not intended to be limited to, inorganic compounds, organic compounds, and metals. With regard to organic materials, all of the polymeric materials with non-centrosymmetric structure and large dipole moment group(s) on the main chain or on the side-chain, or on both chains within the molecules, can be used as suitable candidates for the piezoelectric film. Exemplary polymers include, for example, but are not limited to, poly(sodium 4-styrenesulfonate), poly (poly(vinylamine) backbone azo chromophore), and their derivatives; polyfluorocarbons, including polyvinylidenefluoride, its co-polymer vinylidene fluoride ("VDF"), co-trifluoroethylene, and their derivatives; polychlorocarbons, including poly(vinyl chloride), polyvinylidene chloride, and their derivatives; polyacrylonitriles, and their derivatives; polycarboxylic acids, including poly(methacrylic acid), and their derivatives; polyureas, and their derivatives; polyurethanes, and their derivatives; bio-molecules such as poly-L-lactic acids and their derivatives, and cell membrane proteins, as well as phosphate bio-molecules such as phosphodilipids; polyanilines and their derivatives, and all of the derivatives of tetramines; polyamides including aromatic polyamides and polyimides, including Kapton and polyetherimide, and their derivatives; all of the membrane polymers; poly(N-vinyl pyrrolidone) (PVP) homopolymer, and its derivatives, and random PVP-co-vinyl acetate copolymers; and all of the aromatic polymers with dipole moment groups in the main-chain or side-chains, or in both the main-chain and the side-chains, and mixtures thereof.

Piezoelectric material can also comprise metals selected from the group consisting of lead, antimony, manganese, tantalum, zirconium, niobium, lanthanum, platinum, palladium, nickel, tungsten, aluminum, strontium, titanium, barium, calcium, chromium, silver, iron, silicon, copper, alloys comprising at least one of the foregoing metals, and oxides comprising at least one of the foregoing metals. Suitable metal oxides include $SiO_2$, $Al_2O_3$, $Zro_2$, $TiO_2$, $SrTiO_3$, $PbTiO_3$, $BaTiO_3$, $FeO_3$, $Fe_3O_4$, $ZnO$, and mixtures thereof and Group VIA and IIB compounds, such as CdSe, CdS, GaAs, $AgCaSe_2$, ZnSe, GaP, InP, ZnS, and mixtures thereof. Preferably, the piezoelectric material is selected from the group consisting of polyvinylidene fluoride, lead zirconate titanate, and barium titanate, and mixtures thereof.

Other suitable shape memory materials include shape memory alloy compositions. These types of materials are suitable for fabrication of springs, wires, and clamping means. Shape memory alloys exist in several different temperature-dependent phases. The most commonly utilized of these phases are the so-called martensite and austenite phases. In the following discussion, the martensite phase generally refers to the more deformable, lower temperature phase whereas the austenite phase generally refers to the more rigid, higher temperature phase. When the shape memory alloy is in the martensite phase and is heated, it begins to change into the austenite phase. The temperature at which this phenomenon starts is often referred to as austenite start temperature (As). The temperature at which this phenomenon is complete is called the austenite finish temperature (Af). When the shape memory alloy is in the austenite phase and is cooled, it begins to change into the martensite phase, and the temperature at which this phenomenon starts is referred to as the martensite start temperature (Ms). The temperature at which austenite finishes transforming to martensite is called the martensite finish temperature (Mf). Generally, the shape memory alloys are softer and more easily deformable in their martensitic phase and are harder, stiffer, and/or more rigid in the austenitic phase. In view of the foregoing properties, expansion of the shape memory alloy is preferably at or below the austenite transition temperature (at or below As). Subsequent heating above the austenite transition temperature causes the expanded shape memory material to revert back to its permanent shape. Thus, a suitable activation signal for use with shape memory alloys is a thermal activation signal having a magnitude to cause transformations between the martensite and austenite phases.

The temperature at which the shape memory alloy remembers its high temperature form when heated can be adjusted by slight changes in the composition of the alloy and through heat treatment. In nickel-titanium shape memory alloys, for instance, it can be changed from above about 130° C. to below about −100° C. The shape recovery process occurs over a range of just a few to several degrees and the start or finish of the transformation can be controlled to within a degree or two depending on the desired application and alloy composition.

Suitable shape memory alloy materials include, but are not intended to be limited to, nickel-titanium based alloys, indium-titanium based alloys, nickel-aluminum based alloys, nickel-gallium based alloys, copper based alloys (e.g., copper-zinc alloys, copper-aluminum alloys, copper-gold, and copper-tin alloys), gold-cadmium based alloys, silver-cadmium based alloys, indium-cadmium based alloys, manganese-copper based alloys, iron-platinum based alloys, iron-palladium based alloys, and the like. The alloys can be binary, ternary, or any higher order so long as the alloy composition exhibits a shape memory effect, e.g., change in shape orientation, changes in yield strength, and/or flexural modulus properties, damping capacity, superelasticity, and the like. A preferred shape memory alloy is a nickel-titanium based alloy commercially available under the trademark Flexinol from Dynalloy, Inc. Selection of a suitable shape memory alloy composition depends on the temperature range where the component will operate. Similarly, the SMA may be magnetic shape memory alloys (MSMA).

Electroactive polymers include those polymeric materials that exhibit piezoelectric, pyroelectric, or electrostrictive properties in response to electrical or mechanical fields. An example of an electrostrictive-grafted elastomer with a piezoelectric poly(vinylidene fluoride-trifluoro-ethylene) copolymer. This combination has the ability to produce a varied amount of ferroelectric-electrostrictive molecular composite systems. These may be operated as a piezoelectric sensor or even an electrostrictive actuator.

Materials suitable for use as an electroactive polymer may include any substantially insulating polymer or rubber (or combination thereof) that deforms in response to an electrostatic force or whose deformation results in a change in electric field. Exemplary materials suitable for use as a pre-strained polymer include silicone elastomers, acrylic elastomers, polyurethanes, thermoplastic elastomers, copolymers comprising PVDF, pressure-sensitive adhesives, fluoroelastomers, polymers comprising silicone and acrylic moieties, and the like. Polymers comprising silicone and acrylic moieties may include copolymers comprising silicone and acrylic moieties, polymer blends comprising a silicone elastomer and an acrylic elastomer, for example.

Materials used as an electroactive polymer may be selected based on one or more material properties such as a high electrical breakdown strength, a low modulus of elasticity—(for large or small deformations), a high dielectric constant, and the like. In one embodiment, the polymer is selected such that is has an elastic modulus at most about 100 MPa. In another embodiment, the polymer is selected such that is has a maximum actuation pressure between about 0.05 MPa and about 10 MPa, and preferably between about 0.3 MPa and about 3 MPa. In another embodiment, the polymer is selected such that is has a dielectric constant between about 2 and about 20, and preferably between about 2.5 and about 12. The present disclosure is not intended to be limited to these ranges. Ideally, materials with a higher dielectric constant than the ranges given above would be desirable if the materials had both a high dielectric constant and a high dielectric strength. In many cases, electroactive polymers may be fabricated and implemented as thin films. Thicknesses suitable for these thin films may be below 50 micrometers.

As electroactive polymers of the present disclosure may deflect at high strains, electrodes attached to the polymers should also deflect without compromising mechanical or electrical performance. Generally, electrodes suitable for use may be of any shape and material provided that they are able to supply a suitable voltage to, or receive a suitable voltage from, an electroactive polymer. The voltage may be either constant or varying over time. In one embodiment, the electrodes adhere to a surface of the polymer. Electrodes adhering to the polymer are preferably compliant and conform to the changing shape of the polymer. Correspondingly, the present disclosure may include compliant electrodes that conform to the shape of an electroactive polymer to which they are attached. The electrodes may be only applied to a portion of an electroactive polymer and define an active area according to their geometry. Various types of electrodes suitable for use with the present disclosure include structured electrodes comprising metal traces and charge distribution layers, textured electrodes comprising varying out of plane dimensions, conductive greases such as carbon greases or silver greases, colloidal suspensions, high aspect ratio conductive materials such as carbon fibrils and carbon nanotubes, and mixtures of ionically conductive materials.

Materials used for electrodes may vary. Suitable materials used in an electrode may include graphite, carbon black, colloidal suspensions, thin metals including silver and gold, silver filled and carbon filled gels and polymers, and ionically or electronically conductive polymers. It is understood that certain electrode materials may work well with particular polymers and may not work as well for others. By way of example, carbon fibrils work well with acrylic elastomer polymers while not as well with silicone polymers.

Suitable MR fluid materials include, but are not intended to be limited to, ferromagnetic or paramagnetic particles dispersed in a carrier fluid. Suitable particles include iron; iron alloys, such as those including aluminum, silicon, cobalt, nickel, vanadium, molybdenum, chromium, tungsten, manganese and/or copper; iron oxides, including $Fe_2O_3$ and $Fe_3O_4$; iron nitride; iron carbide; carbonyl iron; nickel and alloys of nickel; cobalt and alloys of cobalt; chromium dioxide; stainless steel; silicon steel; and the like. Examples of suitable particles include straight iron powders, reduced iron powders, iron oxide powder/straight iron powder mixtures and iron oxide powder/reduced iron powder mixtures. A preferred magnetic-responsive particulate is carbonyl iron, preferably, reduced carbonyl iron.

The particle size should be selected so that the particles exhibit multi-domain characteristics when subjected to a magnetic field. Diameter sizes for the particles can be less than or equal to about 1000 micrometers, with less than or equal to about 500 micrometers preferred, and less than or equal to about 100 micrometers more preferred. Also preferred is a particle diameter of greater than or equal to about 0.1 micrometer, with greater than or equal to about 0.5 more preferred, and greater than or equal to about 10 micrometers especially preferred. The particles are preferably present in an amount between about 5.0 to about 50 percent by volume of the total MR fluid composition.

Suitable carrier fluids include organic liquids, especially non-polar organic liquids. Examples include, but are not limited to, silicone oils; mineral oils; paraffin oils; silicone copolymers; white oils; hydraulic oils; transformer oils; halogenated organic liquids, such as chlorinated hydrocarbons, halogenated paraffins, perfluorinated polyethers and fluorinated hydrocarbons; diesters; polyoxyalkylenes; fluorinated silicones; cyanoalkyl siloxanes; glycols; synthetic hydrocarbon oils, including both unsaturated and saturated; and combinations comprising at least one of the foregoing fluids.

The viscosity of the carrier component can be less than or equal to about 100,000 centipoise, with less than or equal to about 10,000 centipoise preferred, and less than or equal to about 1,000 centipoise more preferred. Also preferred is a viscosity of greater than or equal to about 1 centipoise, with greater than or equal to about 250 centipoise preferred, and greater than or equal to about 500 centipoise especially preferred.

Aqueous carrier fluids may also be used, especially those comprising hydrophilic mineral clays such as bentonite or hectorite. The aqueous carrier fluid may comprise water or water comprising a small amount of polar, water-miscible organic solvents such as methanol, ethanol, propanol, dimethyl sulfoxide, dimethyl formamide, ethylene carbonate, propylene carbonate, acetone, tetrahydrofuran, diethyl ether, ethylene glycol, propylene glycol, and the like. The amount of polar organic solvents is less than or equal to about 5.0% by volume of the total MR fluid, and preferably less than or equal to about 3.0%. Also, the amount of polar organic solvents is preferably greater than or equal to about 0.1%, and more preferably greater than or equal to about 1.0% by volume of the total MR fluid. The pH of the aqueous carrier fluid is preferably less than or equal to about 13, and preferably less than or equal to about 9.0. Also, the pH of the aqueous carrier fluid is greater than or equal to about 5.0, and preferably greater than or equal to about 8.0.

Natural or synthetic bentonite or hectorite may be used. The amount of bentonite or hectorite in the MR fluid is less than or equal to about 10 percent by weight of the total MR fluid, preferably less than or equal to about 8.0 percent by weight, and more preferably less than or equal to about 6.0 percent by weight. Preferably, the bentonite or hectorite is present in greater than or equal to about 0.1 percent by weight, more preferably greater than or equal to about 1.0 percent by weight, and especially preferred greater than or equal to about 2.0 percent by weight of the total MR fluid.

Optional components in the MR fluid include clays, organoclays, carboxylate soaps, dispersants, corrosion inhibitors, lubricants, extreme pressure anti-wear additives, antioxidants, thixotropic agents and conventional suspension agents. Carboxylate soaps include ferrous oleate, ferrous naphthenate, ferrous stearate, aluminum di- and tri-stearate, lithium stearate, calcium stearate, zinc stearate and sodium stearate, and surfactants such as sulfonates, phosphate esters, stearic acid, glycerol monooleate, sorbitan sesquioleate, laurates, fatty acids, fatty alcohols, fluoroaliphatic polymeric esters, and titanate, aluminate and zirconate coupling agents and the like. Polyalkylene diols, such as polyethylene glycol, and partially esterified polyols can also be included.

Suitable MR elastomer materials include, but are not intended to be limited to, an elastic polymer matrix comprising a suspension of ferromagnetic or paramagnetic particles, wherein the particles are described above. Suitable polymer matrices include, but are not limited to, poly-alpha-olefins, natural rubber, silicone, polybutadiene, polyethylene, polyisoprene, and the like.

As discussed, the active material based actuator can comprise various combinations of active materials or mechanical, electromechanical, pneumatic, and hydraulic based clamps. For example, elements 14, 16, 18 can be formed of MSMAs, SMAs, EAPs, electrostrictives, magnetostrictives, and the like as previously noted, whereas element 20 is a spring formed of conventional materials or may be formed of smart material such as a shape memory alloy. For elements that provide clamping action, e.g., 14, 16, these may be formed of MR fluids and be activated by an applied magnetic field that changes the shear strength or alternatively, may be formed of a piezoelectric material that is activated by an applied electric field. Other suitable smart materials include those discussed previously including SMAs, MSMAs, EAPs, MRs, piezoelectric polymers, piezoelectric ceramics, electrostrictive, magnetostrictives, electrorheological fluids, various combinations of the foregoing materials, and the like. These, as well as other configurations and combinations are well within the skill of those in the art in view of this disclosure.

Also, as used herein, the terms "first", "second", and the like do not denote any order or importance, but rather are used to distinguish one element from another, and the terms "the", "a", and "an" do not denote a limitation of quantity, but rather denote the presence of at least one of the referenced items. Furthermore, all ranges disclosed herein are inclusive of the endpoints and independently combinable.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

The invention claimed is:

1. An actuator adapted to incrementally translate and/or rotate an object, the actuator comprising:
    a body comprising a first portion, a second portion, and an opening coaxially extending from the first portion and the second portion, wherein the opening is dimensioned to accommodate a cross section of an object;
    a first element disposed in the second portion, and a second element disposed in the first portion, wherein the first and second elements are adapted to selectively clamp the object;
    a spring formed of a shape memory alloy and in operative communication with the first and second portions; and
    a third element fixedly attached to the first and second portions, wherein at least one of the first, second, or third elements or spring is formed of an active material.

2. The actuator of claim 1, wherein the first and/or second elements are formed of a piezoelectric material, a shape memory alloy, a magnetorheological polymer, a magnetostrictive material, an electrorheological fluid, an electroactive polymer, a ferromagnetic shape memory alloy, and combinations comprising at least one of the foregoing active materials.

3. The actuator of claim 1, wherein the third element is a wire formed of a shape memory alloy.

4. The actuator of claim 1, wherein the spring is a torsional spring and is adapted to rotate the object.

5. The actuator of claim 1, wherein the first and/or second elements comprise a magnetorheological or an electrorheological fluid or polymer.

6. The actuator of claim 1, wherein the first, second and third elements or spring not formed of the active material comprise electromechanical, hydraulic, pneumatic, and/or mechanical means for assisting in the incremental translation and/or rotation.

7. The actuator of claim 1, wherein the active material comprises a piezoelectric material, a shape memory alloy, a magnetorheological polymer, a magnetostrictive material, an electrorheological fluid, an electroactive polymer, a ferromagnetic shape memory alloy, and combinations comprising at least one of the foregoing active materials.

* * * * *